(12) United States Patent
Kallesøe et al.

(10) Patent No.: US 9,759,181 B2
(45) Date of Patent: Sep. 12, 2017

(54) COATING COMPOSITION FOR WIND TURBINE BLADES

(75) Inventors: Erik Kallesøe, Nivå (DK); Linda Nysteen, Virum (DK)

(73) Assignee: HEMPEL A/S, Lyngby (DK)

( * ) Notice: Subject to any disclaimer, the term of this patent is extended or adjusted under 35 U.S.C. 154(b) by 0 days.

(21) Appl. No.: 13/265,808

(22) PCT Filed: Apr. 23, 2010

(86) PCT No.: PCT/EP2010/055469
§ 371 (c)(1),
(2), (4) Date: Jan. 3, 2012

(87) PCT Pub. No.: WO2010/122157
PCT Pub. Date: Oct. 28, 2010

(65) Prior Publication Data
US 2012/0093657 A1      Apr. 19, 2012

(30) Foreign Application Priority Data

Apr. 24, 2009  (EP) .................................... 09158706
Oct. 20, 2009  (EP) .................................... 09173494

(51) Int. Cl.
*C08G 18/10* (2006.01)
*F01D 5/00* (2006.01)
(Continued)

(52) U.S. Cl.
CPC ........... *F03D 1/06* (2013.01); *C08G 18/4202* (2013.01); *C08G 18/4236* (2013.01);
(Continued)

(58) Field of Classification Search
CPC ....... C09D 175/04; F01D 5/288; F01D 5/286; C08G 18/4202; C08G 18/4236;
(Continued)

(56) References Cited

U.S. PATENT DOCUMENTS

| | | | |
|---|---|---|---|
| 4,859,791 A | 8/1989 | Nodelman et al. | |
| 5,124,385 A | 6/1992 | Hegedus et al. | |

(Continued)

FOREIGN PATENT DOCUMENTS

| | | |
|---|---|---|
| DE | 69011540 T2 | 12/1994 |
| DE | 10344379 A1 | 4/2005 |

(Continued)

OTHER PUBLICATIONS

Alexit Decklack 471-36 (Topcoat), Preliminary Data Sheet, Data sheet: 471-36, Mankiewicz, Jan. 25, 2005, 10 pages.

(Continued)

*Primary Examiner* — Michael L Leonard
(74) *Attorney, Agent, or Firm* — Birch, Stewart, Kolasch & Birch, LLP

(57) ABSTRACT

The present application discloses a wind turbine blade having on the outer surface thereof a polyurethane-based coating including a polyurethane binder prepared from polyol(s) having an average functionality of ≥2.0 and <8.0; at least 50% (w/w) of the polyols have aliphatic polyester segments included therein and have a Mw of 300-3,000 g/mol; and polyisocyanate(s) having an average functionality of <3.0; at least 50% (w/w) of the polyisocyanate(s) are selected from: (i) polyisocyanates having aliphatic polyester segments included therein, and having a molecular weight of 500-3,000 g/mol and a functionality of ≥2.0 and <3.0; (ii) polyisocyanates of the allophanate type having a Mw of 250-2,000 g/mol and a functionality of ≥2.0 and <3.0; and (iii) polyisocyanates of the uretdion type having a Mw of 250-2,000 g/mol and a functionality of ≥2.0 and <3.0. The application also discloses corresponding coating compositions and a method for coating a substrate.

8 Claims, 2 Drawing Sheets

(51) Int. Cl.
| | |
|---|---|
| F03D 1/06 | (2006.01) |
| C08G 18/42 | (2006.01) |
| C08G 18/73 | (2006.01) |
| F01D 5/28 | (2006.01) |
| C09D 175/04 | (2006.01) |
| C08G 18/78 | (2006.01) |
| C08G 18/79 | (2006.01) |
| C09D 175/06 | (2006.01) |

(52) U.S. Cl.
CPC ..... *C08G 18/4238* (2013.01); *C08G 18/4241* (2013.01); *C08G 18/73* (2013.01); *C08G 18/7837* (2013.01); *C08G 18/798* (2013.01); *C09D 175/04* (2013.01); *C09D 175/06* (2013.01); *F01D 5/286* (2013.01); *F01D 5/288* (2013.01); *F05B 2230/90* (2013.01); *F05B 2260/95* (2013.01); *F05B 2280/6011* (2013.01); *F05C 2253/12* (2013.01); *Y02E 10/721* (2013.01); *Y02P 70/523* (2015.11)

(58) Field of Classification Search
CPC ............ C08G 18/4238; C08G 18/4241; C08G 18/73; C08G 18/7837; C08G 18/7843; C08G 18/79
USPC ....... 416/241 R, 241 A; 427/385.5; 524/589, 524/590, 591; 528/59, 65, 80, 85
See application file for complete search history.

(56) References Cited

U.S. PATENT DOCUMENTS

| | | |
|---|---|---|
| 5,656,677 A | 8/1997 | Jourquin et al. |
| 6,617,413 B1 * | 9/2003 | Bruchmann et al. ............ 528/75 |
| 2004/0110918 A1 * | 6/2004 | Laas .................. C08G 18/0895 528/73 |
| 2004/0247888 A1 | 12/2004 | Watanabe et al. |
| 2005/0027095 A1 | 2/2005 | Wamprecht et al. |
| 2007/0117947 A1 | 5/2007 | Wehner |
| 2007/0142608 A1 | 6/2007 | Laas et al. |
| 2008/0145563 A1 | 6/2008 | Heischkel et al. |
| 2008/0305266 A1 | 12/2008 | Li et al. |

FOREIGN PATENT DOCUMENTS

| | | |
|---|---|---|
| EP | 0320871 B1 | 1/1994 |
| EP | 1502926 A1 | 2/2005 |
| GB | 2287469 A | 9/1995 |
| JP | 2006-124610 A | 5/2006 |
| JP | 2006-328252 A | 12/2006 |
| RU | 2215012 C2 | 10/2003 |
| WO | WO 00/34651 A1 | 6/2000 |
| WO | WO-2005/092586 A1 | 10/2005 |
| WO | WO-2008/031879 A1 | 3/2008 |
| WO | WO-2009/111227 A1 | 9/2009 |

OTHER PUBLICATIONS

Bach et al., "Römpp Lexikon Lacke und Druckfarben," Georg Thieme Verlag, ISBN 3-13-776001-1, 1998, p. 603.
BASF, "Basonat® HA grades," Technical Information, EVP 007205 e, Jun. 2007, pp. 1-3.
Bayer Material Science, "Products and Properties Baycoll®/Desmodur®/Desmophen® for reactive Adhesives Commercial and Trial Products," Order No. MS006586, May 23, 2006, pp. 1-20.
Bayer Material Science, "Products and Properties Desmodur®/Desmophen® for coatings," Bayer Material Science Products Brochure, Feb. 18, 2004, pp. 1-29.
Bayer, "Polyurethane raw materials for reactive adhesives," http://www.bayercoatings.com/BMS/DB-RSC/BSM_RSG_CAS.nsf/id/ADEN_Raw_Materials_for_reactive_Adhesives, English version downloaded on Mar. 31, 2014 (publication date unknown), pp. 1-5, with English translation.
Bourscheidt et al., "Wenn erneuerbar, dann ohne petrochemie," WIND wissenschaft und technik, Erneuerbare Energien, Apr. 2008, pp. 38-39.
Chalmers et al. (Editors), "Comprehensive Analytical Chemistry," Molecular Characterization and Analysis of Polymers, Wilson & Wilson's, vol. 53, Edited by John M. Chalmers and Robert J. Meier, Dec. 9, 2008, pp. 245-248 and 251.
Hare, "Protective Coatings, Fundamentals of Chemistry and Composition," Polyurethanes, table 16-5, Chapter 16, 1994, 4 pages.
Key Product Data of Aliphatic Polyisocyanates Desmodur, Bayer Material Science, www.bayercoatings.com, Feb. 2009, 2 pages.
PPG Industries, "AUE-80000 Series High Performance Erosion Resistant Polyurethane Topcoat," Enabling Energy Fiber Glass and Coating for Wind Power, 2009, 2 pages.
Tobin, "Rain erosion testing of composite materials: the design of a laboratory test facility," 3rd International Supply on the wings Conference, Frankfurt, Germany, Nov. 11-13, 2008, p. 113.
Zorll et al., Lacke und Druckfarben, RÖMPP Lexikon, Georg Thieme Verlag, Stuttgart, New York, 1998, p. 13 (3 pages total).
Bayer, "Desmodur N 3800," (cited on May 22, 2015 as Document D29a in Opposition Proceeding re European Patent No. 2325072), Jan. 27, 2003, pp. 1-3.
Mankiewicz, "Data sheet for ALEXIT-Härter," (cited on May 22, 2015 as Document D13 in Opposition Proceeding re European Patent No. 2325072), Apr. 7, 2006, pp. 1-8.
PMG "PPG Introduces HYBON 2026 Fiber Glass Roving for Wind Market," (Article cited on May 22, 2015 as Document D18 in Opposition Proceeding re European Patent No. 2325072) Aug. 26, 2009, pp. 1-5.
Wikipedia, "Wind Turbine," Date Unknown (Article cited on Jun. 15, 2015 as Document D33 in Opposition Proceeding re European Patent No. 2325072), pp. 1-14.
Wikipedia, "Blade element momentum theory," Date Unknown (Article cited on May 22, 2015 as Document D31 in Opposition Proceeding re European Patent No. 2325072), 1 page.
Bayer, "Letter to Dr. Jochen Wehner from Michael Grahl of Bayer Material Science AG," Date Unknown (Letter cited on May 22, 2015 as Document D29b in Opposition Proceeding re European Patent No. 2325072), 1 page (w/ English translation).
Farbes & Lack, "Niedrigviskos und Lichtecht," (Article cited on May 22, 2015 as Document D32 in Opposition Proceeding re European Patent. No. 2325072) Nov. 2005, 5 pages (w/ English translation).
Wikipedia, "Turboprop," Date Unknown (Article cited on May 22, 2015 as Document D30 in Opposition Proceeding re European Patent No. 2325072), 5 pages (w/ English translation).

* cited by examiner

COATING COMPOSITION FOR WIND TURBINE BLADES

This Application is the National Phase Under 35 U.S.C. §371 of PCT International Application No. PCT/EP2010/055469 which has an International filing date of Apr. 23, 2010, which claims priority to European Patent Application No. 09158706.3 filed on Apr. 24, 2009 and to European Patent Application No. 09173494.7 filed on Oct. 20, 2009. The entire contents of all applications listed above are hereby incorporated by reference.

FIELD OF THE INVENTION

The present invention relates to improved coating compositions of anti-erosive topcoats for wind turbine blades.

BACKGROUND OF THE INVENTION

For many years it has been common practice in the wind turbine industry to protect the leading edge of the blades against erosion resulting from collision with raindrops, dust particles, insects, hailstones and the like by gluing an anti-erosive tape onto the critical areas.

Applying the tape is a difficult and time consuming task which many blade manufacturing companies would prefer to avoid. Furthermore, the edge of the tape may result in unwanted turbulence and noise.

Substituting the tape with a highly anti-erosive topcoat reduces production time and ensures a smooth surface.

Up till now, it was believed that a main feature of coatings for such edges should be a high degree of abrasion resistance, but it has recently been suggested that elasticity also plays a role.

US 2004/110918 A1 discloses a process for producing cross-linkers for polyurethane powder coatings. The cross-linkers typically includes few free isocyanate groups, however uretdione groups will disintegrate upon heating and result in further isocyanate groups. US 2007/0142608 A1 discloses the further developments of the process of D1 in which a bismuth-containing catalyst is used.

WO 2005/092586 A1 discloses methods for preparing wind turbine blades coating with a thermoplastic film, which is suitable as the wind turbine blade surface. Preferably, the materials to form the coating comprise acrylic-based material, polycarbonate, FCDF (polyvinylidene fluoride), polyurethane or a blend.

U.S. Pat. No. 4,859,791 discloses polyols for use in composition for the preparation of polyurethanes. The polyols have a molecular weight of 850-2,000, a functionality of 5-9, and are prepared from polyfunctional polycycloaliphatic or aromatic carboxylic acids and optionally up to about 50% by weight of at least one acyclic, polyfunctional carboxylic acid.

JP 2006-124610 and JP 2006-328252 disclose coating compositions of a combination of a polyol and a polyisocyanate of the allophanate type.

WO 2009/111227 discloses composites comprising a multi-layered coating system, including a topcoat of a functional component comprising hydroxyl and/or amine groups, and a curing agent comprising isocyanate and/or anhydride functional groups.

It has now been found that polyurethane-based coatings formed by a combination of a particularly selected type of polyols and particularly selected types of polyisocyanates constitute excellent outermost coatings for wind turbine blades in that such coatings provide a suitable combination of flexibility and durability.

OBJECT OF THE INVENTION

It is an object of embodiments of the invention to provide improved coating compositions of topcoats for wind turbine blades which will reduce the extensive wear at the leading edge of the blades caused by the collision with interacting particles, e.g. rain drops.

SUMMARY OF THE INVENTION

Contrary to prior considerations focusing on abrasive resistant coatings, it has now been found that coatings having a particularly adjusted degree of flexibility can more advantageously solve the problem of extensive wear at the leading edge of wind turbine blades in that such coatings are capable of absorbing and/or reflecting the energy of particles (e.g. rain drops) colliding with the blades at high speed.

Hence, the present invention provides an easy to apply alternative to the traditional anti-erosive tape and furthermore, it eliminates or reduces unwanted turbulence and noise. Applying a highly anti-erosive topcoat on the leading edge of wind turbine blades (or the entire blade surface) prolongs the lifetime of the wind turbine blade and slows down development of local damages.

More particular, the present invention provides essential protection of the leading edge of wind turbine blades against erosion caused by collision with interacting particles, e.g. rain drops.

Hence, one aspect of the present invention relates to a wind turbine blade having on at least a part of the outer surface thereof, as the outermost layer, a polyurethane-based coating, cf. claim 1.

Another aspect of the present invention relates to a coating composition, cf. claim 7.

A still further aspect of the present invention relates to a method of coating a substrate, cf. claim 11.

LEGENDS TO THE FIGURE

DETAILED DESCRIPTION OF THE INVENTION

Figure 1:
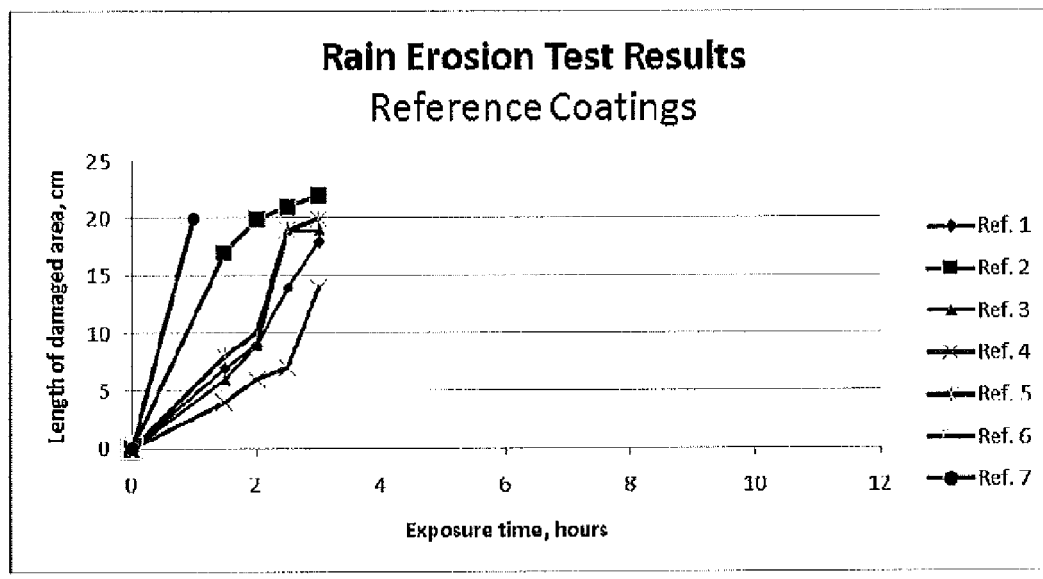
FIG. 1 illustrates the results of the Rain Erosion Test (RET) for a series of seven Reference Coatings.

As mentioned above, the present invention provides a wind turbine blade having on at least a part of the outer surface thereof, as the outermost layer, a polyurethane-based coating, said coating including a polyurethane binder prepared from:

(a) a base component consisting of one or more polyols, said one or more polyols having an average functionality of at least 2.0 and less than 8.0; wherein at least 50%, such as at least 60%, in particular at least 70%, by weight of said one or more polyols have aliphatic polyester segments included therein and have a molecular weight of 300-3,000 g/mol; and (b) a curing agent component consisting of one or more polyisocyanates, said one or more polyisocyanates having an average functionality of less than 3.0; wherein at least 50%, such as at least 60%, in particular at least 70%, by weight of said one or more polyisocyanates are selected from:

(i) polyisocyanates having polyester segments included therein, and having a molecular weight of 500-3,000 g/mol and a functionality of at least 2.0 and less than 3.0;

(ii) polyisocyanates of the allophanate type having a molecular weight of 250-2,000 g/mol and a functionality of at least 2.0 and less than 3.0; and (iii) polyisocyanates of the uretdion type having a molecular weight of 250-2,000 g/mol and a functionality of at least 2.0 and less than 3.0.

In the present context, the term "outermost layer" refers to the final coating system applied to the wind turbine blade, i.e. the outermost layer when the wind turbine blade is in operation.

The principal constituents of the polyurethane binder are the base component and the curing agent component. In most embodiments, these components are in fact the only components reflected in the final structure of the polyurethane binder.

In terms of the complete coating composition, it typically consists of a "base" (in which the base component (i.e. the one or more polyols) is included) and a "curing agent" (in which the curing agent component (i.e. the one or more polyisocyanates) is included). Typically, the "base" and "curing agent" further include a number of other constituents, e.g. fillers and pigments, accelerators, additives and solvents. The nature of such other constituents is discussed further below.

An important characteristic of the polyols and the polyisocyanates is the functionality.

For each polyol (constituents of the base component), the "functionality" is defined as the number of hydroxyl groups present per molecule. For practical purposes, the number of hydroxyl groups is provided as an average due to the presence of various related types of polyol molecules within a commercial product.

Similarly, for each polyisocyanate (constituents of the curing agent component), the "functionality" is defined as the number of isocyanate groups present per molecule. Again, and for practical purposes, the number of isocyanate groups is provided as an average due to the presence of various related types of polyisocyanate molecules within a commercial product.

The expression "average functionality" refers to the functionality of a combination of two or more polyols, or a combination of two or more polyisocyanates. In both instances, the "average functionality" is calculated as the total number of reactive groups (hydroxyl or isocyanate groups) divided by the total number of molecules (polyol or polyisocyanate).

The expression "molecular weight" is intended to mean the weight average molecular weight of the species in question, unless otherwise specified. In reality, commercial polymer products will always include a mixture of polymer chains of different lengths, hence the expression "average molecular weight".

For the polyurethane binder defined herein, the average functionality of the one or more polyols must be at least 2.0 and less than 8.0. For a higher average functionality, it is believed that the polyurethane binder might become too inflexible (brittle), and for lower average functionality the polyurethane binder might become mechanically too weak. In the currently most preferred embodiments, the average functionality of the one or more polyols is 2.0-6.3, such as 2.0-5.5.

Moreover, for the polyurethane binder defined herein, the average functionality of the one or more polyisocyanates must be less than 3.0. For a higher average functionality, it is believed that the polyurethane binder becomes too inflexible. In the currently most preferred embodiments, the average functionality of the one or more polyisocyanates is at least 2.0 and less than 3.0.

The ratio of the number of isocyanate groups in the curing agent component (in total) to the number of hydroxyl groups in the base component (in total) also appears to play a certain role. As a matter of fact, the number of isocyanate groups is preferably in excess of the number of hydroxyl groups. In particular, it may be preferred that the number of isocyanate groups in the curing agent component to the number of hydroxyl groups in the base component is in the range of 80:100 to 160:100, such as 90:100 to 125:100, or 80:100 to 105:100, or 80:100 to 100:100, or 100:100 to 160:100.

Also important is the actual types of polyols (base component) and polyisocyanates (curing agent component) from which the polyurethane binder is prepared.

With respect to the base component, at least 50%, such as at least 60%, in particular at least 70%, by weight of the one or more polyols should have aliphatic polyester segments included therein and should have a molecular weight of 300-3,000 g/mol, in particular 500-2,500 g/mol. More preferably, at least 80% by weight, such as at least 90% by weight, and in particular essentially all polyols, fulfill these criterions.

The term "aliphatic polyester segments" is intended to encompass —C—C(=O)—O—C— and/or —C—O—C(=O)—O—C— structural elements. Moreover, such segments do not include aromatic or heteroaromatic structural elements; hence the expression "aliphatic".

Preferred types of polyols are those of the "linear" type, i.e. those having no or very few side chains and/or cyclic structures resulting in high molecular mobility.

In some embodiments, the polyol may have a combination of linear and cyclic aliphatic polyester segments.

In addition to the "aliphatic polyester segments", the polyol may in some embodiments also have "aromatic polyester segments". The term "aromatic polyester segments" is intended to encompass —X—C(=O)—O—Y— and/or —X—O—C(=O)—O—Y— structural elements wherein at least one of X and Y represents an aromatic/heteroaromatic structural element.

Illustrative examples of commercially available polyols which are useful within the present invention are those, e.g., selected from Desmophen 670-BA80 (Bayer Material Science), Setal 26855-80 (Nuplex), Synolac 9770 BA80 (Cray Valley), and from those having no side chains, e.g. Synolac 5085 (Cray Valley), Synolac 5086 (Cray Valley), Desmophen VP LS 2328 (Bayer Material Science), Desmophen C XP 2716 (Bayer Material Science), Desmophen C 1100 (Bayer Material Science), Capa 2043, (Perstorp), Oxymer M112 (Perstorp) and Oxymer M56 (Perstorp).

With respect to the one or more polyols, up to 100% by weight may be of the polycaprolactone type. When used herein, the term "polycaprolactone type" is intended to mean materials containing the following segment:

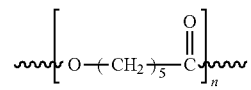

With respect to the curing agent component, at least 50%, such as at least 60%, in particular at least 70%, by weight of the one or more polyisocyanates are selected from:
(i) polyisocyanates having polyester segments, in particular aliphatic polyester segments, included therein, and having a molecular weight of 500-3,000 g/mol and a functionality of at least 2.0 and less than 3.0;
(ii) polyisocyanates of the allophanate type having a molecular weight of 250-2,000 g/mol and a functionality of at least 2.0 and less than 3.0; and
(iii) polyisocyanates of the uretdion type having a molecular weight of 250-2,000 g/mol and a functionality of at least 2.0 and less than 3.0.

More preferably, at least 80% by weight, such as at least 90% by weight, and in particular essentially all polyisocyanates, are selected from types (i)-(iii) above.

In some currently preferred embodiments, the curing agent comprises polyisocyanate types based on hexamethylene diisocyanate (HDI).

It is believed that the polyisocyanate types (i)-(iii) above are especially suited for providing desirable properties to the resulting coating with respect to flexibility and durability in operation.

Polyisocyanates for the first type (i) are characterised by having polyester segments, in particular aliphatic polyester segments, included therein, and having a molecular weight of 500-3,000 g/mol, such as 500-2,000 g/mol, in particular 600-1,500 g/mol, and a functionality of at least 2.0 and less than 3.0, in particular a functionality of 2.0-2.8.

Like for the polyols, the polyisocyanates may in some embodiments—in addition to the "aliphatic polyester segments"—also have "aromatic polyester segments". The term "aromatic polyester segments" is intended to encompass —X—C(=O)—O—Y— and/or —X—O—C(=O)—O—Y— structural elements wherein at least one of X and Y represents an aromatic/heteroaromatic structural element.

Illustrative examples of commercially available polyisocyanates of type (i) which are useful within the present invention are those selected from Desmodur N 3800 (Sayer Material Science), and NP 1200 (Mitsui Chemical Polyurethanes Inc.).

In the embodiments where the polyisocyanates include polyisocyanates of type (i) above, the polyols of the polycaprolactone type may preferably constitute 5-50%, such 15-40%, in particular 25-35%, or even 30-35%, by total weight of the polyols included.

Polyisocyanates of the second type (ii) are characterised by being of the allophanate type and by having a molecular weight of 250-2,000 g/mol and a functionality of at least 2.0 and less than 3.0, in particular a functionality of 2.0-2.8.

The term "allophanate type" is intended to mean materials containing the following segment:

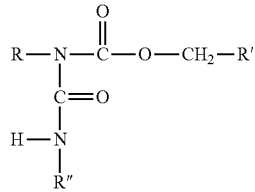

wherein (typically) each of R, R' and R" are organic radicals (e.g. selected from alkyls, esters, ethers). At least two of R, R' and R" are carrying an isocyanate group corresponding to an overall functionality of at least 2.0 and less than 3.0.

Illustrative examples of commercially available polyisocyanates of type (ii) which are useful within the present invention are those selected from XP2500 (Bayer Material Science), Desmodur XP 2580 (Bayer Material Science), Basonat HA 100 (BASF), Basonat HA 200 (BASF), Basonat HA 300 (BASF), and D 178 N (Mitsui Chemical Polyurethanes Inc.).

In the embodiments where the polyisocyanates include polyisocyanates of type (ii) above, the polyols of the polycaprolactone type may preferably constitute 10-100%, such 20-100%, in particular 30-100%, or 30-90%, by total weight of the polyols included.

Polyisocyanates of the third type (iii) are characterised by being of the uretdion type having a molecular weight of 250-2,000 g/mol and a functionality of at least 2.0 and less than 3.0, in particular a functionality of 2.0-2.8.

The term "uretdion type" is intended to mean materials containing the following segment:

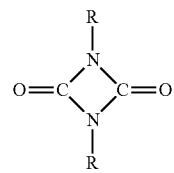

wherein (typically) each R represents an organic radical (e.g. selected from alkyls, esters, ethers) of which some carry one or more isocyanate groups corresponding to an overall functionality of at least 2.0 and less than 3.0.

Illustrative examples of commercially available polyisocyanates of type (iii) which are useful within the present invention are those selected from Desmodur N 3400 (Bayer Material Science) and Desmodur XP 2730 (Bayer Material Science).

In the embodiments where the polyisocyanates include polyisocyanates of type (iii) above, the polyols of the polycaprolactone type may preferably constitute 5-50%, such 15-40%, in particular 25-35%, or even 30-35%, by total weight of the polyols included.

In currently preferred embodiments (and as a result of the selection of the polyols and polyisocyanates specified above), the degree of branching within the polyurethane-based coating is low allowing a high degree of molecular mobility. This is advantageous in order to obtain the necessary flexibility.

Preparation of the Polyurethane-Based Coating Composition

The polyurethane binder is typically prepared from commercially available polyols and polyisocyanates, e.g. in combination with fillers and pigments, solvents and additives including accelerators.

Hence, the base (including the polyol(s)) and/or the curing agent (including the polyisocyanate(s)) may typically include one or more other constituents, e.g. fillers and pigments, solvents and additives (e.g. thickening agents, wetting agents, dispersing agents, anti-sag agents, anti-settling agents, defoamers, stabilizers and accelerators).

Examples of fillers and pigments are calcium carbonate, dolomite, talc, mica, barium sulfate, kaolin, silica, titanium dioxide, red iron oxide, yellow iron oxide, black iron oxide, carbon black, phthalocyanine blue and phthalocyanine green.

Moreover, the base and the curing agent are typically supplemented with one or more solvents in order to facilitate mixing of the components or in order to ease the application of the coating composition. Examples of suitable solvents are toluene, xylene and naphtha solvent; ketones such as methyl ethyl ketone, methyl isobutyl ketone, diacetone alcohol and cyclohexanone; esters such as methoxypropyl acetate, n-butyl acetate and 2-ethoxyethyl acetate; and mixtures thereof.

The one or more solvents are typically present in the coating composition in an amount of 0-45% by weight, e.g. in an amount of 0-35% by weight, for example 0-18% by weight, such as 0-10% (e.g. 0-5%) by weight of the coating composition.

In some embodiments, the one or more solvents are present in the coating composition in an amount of 5-45% by weight, e.g. 10-35% by weight, such as 20-30% by weight of the coating composition.

In other embodiments, however, a solvent is not necessary due to the low viscosity of the remaining constituents of the coating composition. Hence, in such instances, the one or more solvents are included (or not included) in an amount of 0-35% by weight, e.g. 0-18% by weight, such as 0-10% by weight of the coating composition. In some of these embodiments, solvents are absent.

Examples of additives are wetting agents and dispersants; defoaming agents such as silicone oils; stabilisers such as stabilisers against light and heat, e.g. hindered amine light stabilisers (HALS); stabilisers against moisture (water scavengers) such as substituted isocyanates, substituted silanes, ortho formic acid trialkyl esters and synthetic zeolites; stabilisers against oxidation such as butylated hydroxyanisole and butylated hydroxytoluene; thickeners and anti-settling agents such as organo-modified clays (Bentone), polyamide waxes and polyethylene waxes.

Typical examples of suitable accelerators are metal containing organic compounds. Illustrative examples of commercially available accelerators which are useful within the present invention are those selected from dibutyltindilaurate, bismuth neodecanoate and zinc octoate.

The proper selection of the accelerator and the amount thereof is within the skilled person's regimen. Hence, the application of a very high amount of accelerator will most often render the resulting coating too brittle, whereas a very small amount of (or no) accelerator will have impact on the curing rate. In fact, the curing may typically be too slow without the presence of an accelerator, unless other factors, e.g. temperature or the reactivity of the polyols and the polyisocyanates, provides conditions for an increase in the reaction rate.

In some currently preferred embodiments, the polyurethane binder is prepared in the presence of one or more accelerators.

In some currently preferred embodiments, the coating composition which gives rise to the coating on the wind turbine blade is as follows:
10-40%, in particular 20-30%, by weight of the one or more polyols;
15-35%, in particular 20-30%, by weight of the one or more polyisocyanates;
0.0-0.5%, in particular 0.01-0.2%, by weight of one or more accelerators;
5-10%, in particular 6-8%, by weight of additives;
5-25%, in particular 10-20%, by weight of fillers and pigments; and
10-35%, in particular 20-30%, by weight of one or more solvents.

In another variant, the coating composition is as follows:
10-50%, in particular 20-35%, such as 20-30%, by weight of the one or more polyols;
15-45%, in particular 20-35%, such as 20-30%, by weight of the one or more polyisocyanates;
0.0-0.5%, in particular 0.01-0.2%, by weight of one or more accelerators;
5-10%, in particular 6-8%, by weight of additives;
5-35%, in particular 10-25%, such as 10-20%, by weight of fillers and pigments; and
0-35%, in particular 0-10%, by weight of one or more solvents.

Application of the Polyurethane-Based Coating Composition

The polyurethane binder is prepared from the base component (including the one or more polyols) and the curing agent component (including the one or more polyisocyanates). In practical embodiments, the two components are mixed either in a single batch for normal spray application or as a continuous process when plural component spray equipment is used. Prior to mixing one of the components or both components may be preconditioned to meet specific temperature requirements.

Application of the polyurethane-based coating composition can be done by normal application methods e.g. brush, roller, airless spray, plural component airless spray, heated plural component airless spray and the like.

With the aim of facilitating easy application of the coating composition (e.g. by spray, brush or roller application techniques), the coating composition typically has a viscosity in the range of 25-25,000 mPa·s, such as in the range of 150-15,000 mPa·s, in particular in the range of 200-1,000 mPa·s. In contrast hereto, coating compositions adapted for powder coating are solids and have no measurable viscosity. In the present application with claims, viscosity is measured at 25° C. in accordance with ISO 2555:1989.

The base (including the one or more polyols) and the curing agent (including the one or more polyisocyanates) are mixed prior to application allowing the formation of the polyurethane binder through chemical reaction of hydroxyl groups and isocyanate groups. The mixing ratio between the two components must be carefully controlled in order to obtain a polyurethane binder with the right physical properties, cf. the considerations with respect to the ratio between the number of isocyanate groups in the curing agent component to the number of hydroxyl groups in the base component discussed further above.

The mixing ratio is defined as the volumetric or weight ratio between the base and the curing agent. The volumetric mixing ratio is typically between 1:1 and 10:1, in particular 1:1 to 4:1.

Preferably, the dry film thickness of the polyurethane-based coating is 20-1,000 μm, typically 50-300 μm.

Also preferably, the part of the outer surface of the wind turbine blade coated with the polyurethane-based coating composition comprises at least a predominant portion of the leading edge of the blade, but the total surface of the wind turbine blade can be coated with the polyurethane-based coating composition.

Hence, the present invention also provides a method of coating a substrate, said method comprising the steps:
(a) applying a coating composition as defined herein to at least a part of the surface of said substrate thereby;
(b) allowing the coating composition to cure.

After application of the coating composition to the substrate, the coating composition is preferably cured at a temperature of the coating composition not exceeding 90° C., e.g. not exceeding 70° C., in particular at a temperature in the range of 0-45° C., such as a temperature in the range of 15-35° C. The actual temperature at which the coating composition can be cured is normally set at the lower limit by the temperature at which the coating composition is practically curable and at the upper limit by the temperature at which the integrity of the substrate and any underlying coats will be compromised. As an example, most composites used for wind turbine blades may allow for a curing temperature of up to above 70° C., whereas aluminium substrates may readily allow for curing temperatures of up to about 90° C. Another factor is the curing time where an increase in curing temperature of about 10° C. typically will reduce the curing time with a factor of two.

Preferred features of the polyurethane-based coating are—in addition to the high degree of flexibility—cohesion of the film (as a result of the cross-linking density), UV-resistance, gloss retention, adhesion to underlying coatings.

Alternative Embodiments

In an alternative embodiment, the coating composition may be applied as a so-called gel-coat. In this embodiment, the coating is not necessarily the outermost layer on the surface of the wind turbine blade, but may be covered by a top-coat. In some interesting embodiments, however, the gel-coat is the outermost layer.

Specific Embodiments of the Invention

In one currently preferred embodiment of the invention, the polyurethane binder is prepared from:
(a) a base component consisting of one or more polyols, said one or more polyols having an average functionality of 2.0-6.3; wherein at least 90% by weight of said one or more polyols have aliphatic polyester segments included therein and have a molecular weight of 300-2,400 g/mol; and
(b) a curing agent component consisting of one or more polyisocyanates, said one or more polyisocyanates having an average functionality of 2.1-2.9; wherein at least 80% by weight of said one or more polyisocyanates are (i) polyisocyanates having polyester segments, in particular aliphatic polyester segments, included therein, and having a molecular weight of 700-1,200 g/mol and a functionality of at least 2.0 and less than 2.8.

In this embodiment, up to 100% by weight of said one or more polyols may be of the polycaprolactone type.

In one variant of the above embodiment, the one or more polyols have an average functionality of 4.6-6.1, wherein at least 90% by weight of said one or more polyols have aliphatic polyester segments included therein and have a molecular weight of 1,800-2,400 g/mol.

In another variant of the above embodiment, the one or more polyols have an average functionality of 3.1-6.2, wherein at least 90% by weight of said one or more polyols have aliphatic polyester segments included therein and have a molecular weight of 1,000-2,300 g/mol, and 5-50% by weight of said one or more polyols are of the polycaprolactone type.

In still another variant of the above embodiment, the one or more polyols have an average functionality of 3.4-5.8, wherein at least 90% by weight of said one or more polyols have aliphatic polyester segments included therein and have a molecular weight of 1,200-2,100 g/mol, and 15-40% by weight of said one or more polyols are of the polycaprolactone type.

In still another variant of the above embodiment, the one or more polyols have an average functionality of 3.5-5.5, wherein at least 90% by weight of said one or more polyols have aliphatic polyester segments included therein and have a molecular weight of 1,250-1,950 g/mol, and 25-35% by weight of said polyols are of the polycaprolactone type.

In still another variant of the above embodiment, the one or more polyols have an average functionality of 3.5-5.3, wherein at least 90% by weight of said one or more polyols have aliphatic polyester segments included therein and have a molecular weight of 1,250-1,850 g/mol, and 30-35% by weight of said polyols are of the polycaprolactone type.

In another currently preferred embodiment of the invention, the polyurethane binder is prepared from:
(a) a base component consisting of one or more polyols, said one or more polyols having an average functionality of 2.0-6.3; wherein at least 90% by weight of said one or more polyols have aliphatic polyester segments included therein and have a molecular weight of 300-2,400 g/mol; and
(b) a curing agent component consisting of one or more polyisocyanates, said one or more polyisocyanates having an average functionality of 2.0-2.8; wherein at least 90% by weight of said one or more polyisocyanates are (ii) polyisocyanates of the allophanate type having a molecular weight of 400-650 g/mol and a functionality of at least 2.0 and less than 2.8

In this embodiment, up to 100% by weight of said one or more polyols may be of the polycaprolactone type.

In one variant of the above embodiment, the one or more polyols have an average functionality of 3.7-4.8, wherein at least 90% by weight of said one or more polyols have aliphatic polyester segments included therein and have a molecular weight of 1,300-1,800 g/mol.

In another variant of the above embodiment, the one or more polyols have an average functionality of 2.0-6.0, wherein at least 90% by weight of said one or more polyols have aliphatic polyester segments included therein and have a molecular weight of 300-2,200 g/mol, and 10-100% by weight of said one or more polyols are of the polycaprolactone type.

In still another variant of the above embodiment, the one or more polyols have an average functionality of 2.0-5.6, wherein at least 90% by weight of said one or more polyols have aliphatic polyester segments included therein and have a molecular weight of 300-2,000 g/mol, and 20-100% by weight of said one or more polyols are of the polycaprolactone type.

In still another variant of the above embodiment, the one or more polyols have an average functionality of 2.0-5.3, wherein at least 90% by weight of said one or more polyols have aliphatic polyester segments included therein and have a molecular weight of 300-1,800 g/mol, and 30-100% by weight of said one or more polyols are of the polycaprolactone type.

In still another variant of the above embodiment, the one or more polyols have an average functionality of 2.0-2.2; wherein at least 90% by weight of said one or more polyols have aliphatic polyester segments included therein and have a molecular weight of 300-500 g/mol, and at least 90% by weight of said one or more polyols are of the polycaprolactone type.

In a still further currently preferred embodiment of the invention, the polyurethane binder is prepared from:
(a) a base component consisting of one or more polyols, said one or more polyols having an average functionality of 2.0-6.3, wherein at least 90% by weight of said one or more polyols have aliphatic polyester segments included therein and have a molecular weight of 300-2,400 g/mol; and
(b) a curing agent component consisting of one or more polyisocyanates, said one or more polyisocyanates having an average functionality of 2.0-2.8; wherein at least 90% by weight of said one or more polyisocyanates are (iii) polyisocyanates of the uretdion type having a molecular weight of 300-600 g/mol and a functionality of at least 2.0 and less than 2.8.

In this embodiment, up to 100% by weight of said one or more polyols may be of the polycaprolactone type.

In one variant of the above embodiment, the one or more polyols have an average functionality of 3.1-6.2, wherein at least 90% by weight of said one or more polyols have aliphatic polyester segments included therein and have a molecular weight of 1,000-2,300 g/mol, and 5-50% by weight of said one or more polyols are of the polycaprolactone type.

In another variant of the above embodiment, the one or more polyols have an average functionality of 3.4-5.8, wherein at least 90% by weight of said one or more polyols have aliphatic polyester segments included therein and have a molecular weight of 1,200-2,100 g/mol, and 15-40% by weight of said one or more polyols are of the polycaprolactone type.

In still another variant of the above embodiment, the one or more polyols have an average functionality of 3.5-5.5, wherein at least 90% by weight of said one or more polyols have aliphatic polyester segments included therein and have a molecular weight of 1,250-1,950 g/mol, and 25-35% by weight of said one or more polyols are of the polycaprolactone type.

In still another variant of the above embodiment, the one or more polyols have an average functionality of 3.5-5.3, wherein at least 90% by weight of said one or more polyols have aliphatic polyester segments included therein and have a molecular weight of 1,250-1,850 g/mol, and 30-35% by weight of said one or more polyols are of the polycaprolactone type.

Novel Coating Compositions

It is believed that some of the coating compositions corresponding to those useful for forming the polyurethane-based coating layer of the wind turbine blade are novel as such.

Hence, the present invention also provides a coating composition comprising:
(a) a base component consisting of one or more polyols, said one or more polyols having an average functionality of at least 2.0 and less than 8.0; wherein at least 50%, such as at least 60%, in particular at least 70%, by weight of said one or more polyols have aliphatic polyester segments included therein and have a molecular weight of 300-3,000 g/mol; and
(b) a curing agent component consisting of one or more polyisocyanates, said one or more polyisocyanates having an average functionality of less than 3.0; wherein at least 50%, such as at least 60%, in particular at least 70%, by weight of said one or more polyisocyanates are selected from:
  (i) polyisocyanates having polyester segments, in particular aliphatic polyester segments, included therein, and having a molecular weight of 500-3,000 g/mol and a functionality of at least 2.0 and less than 3.0;
  (ii) polyisocyanates of the allophanate type having a molecular weight of 250-2,000 g/mol and a functionality of at least 2.0 and less than 3.0; and
  (iii) polyisocyanates of the uretdion type having a molecular weight of 250-2,000 g/mol and a functionality of at least 2.0 and less than 3.0;
(c) one or more further components selected from fillers and pigments, additives, accelerators and solvents.

Various embodiments of the coating composition of the invention are as described further above for the coating of the wind turbine blade.

In one currently preferred embodiment hereof, the composition comprises:
(a) a base component consisting of one or more polyols, said one or more polyols having an average functionality of 2.0-6.3; wherein at least 90% by weight of said one or more polyols have aliphatic polyester segments included therein and have a molecular weight of 300-2,400 g/mol; and
(b) a curing agent component consisting of one or more polyisocyanates, said one or more polyisocyanates having an average functionality of 2.1-2.9; wherein at least 80% by weight of said one or more polyisocyanates are (i) polyisocyanates having polyester segments, in particular aliphatic polyester segments, included therein, and having a molecular weight of 700-1,200 g/mol and a functionality of at least 2.0 and less than 2.8.

In this embodiment, up to 100% by weight of said one or more polyols may be of the polycaprolactone type.

In one variant of the above embodiment, the one or more polyols have an average functionality of 4.6-6.1, wherein at least 90% by weight of said one or more polyols have aliphatic polyester segments included therein and have a molecular weight of 1,800-2,400 g/mol.

In another variant of the above embodiment, the one or more polyols have an average functionality of 3.1-6.2, wherein at least 90% by weight of said one or more polyols have aliphatic polyester segments included therein and have a molecular weight of 1,000-2,300 g/mol, and 5-50% by weight of said one or more polyols are of the polycaprolactone type.

In still another variant of the above embodiment, the one or more polyols have an average functionality of 3.4-5.8, wherein at least 90% by weight of said one or more polyols have aliphatic polyester segments included therein and have a molecular weight of 1,200-2,100 g/mol, and 15-40% by weight of said one or more polyols are of the polycaprolactone type.

In still another variant of the above embodiment, the one or more polyols have an average functionality of 3.5-5.5, wherein at least 90% by weight of said one or more polyols have aliphatic polyester segments included therein and have a molecular weight of 1,250-1,950 g/mol, and 25-35% by weight of said polyols are of the polycaprolactone type.

In still another variant of the above embodiment, the one or more polyols have an average functionality of 3.5-5.3, wherein at least 90% by weight of said one or more polyols have aliphatic polyester segments included therein and have a molecular weight of 1,250-1,850 g/mol, and 30-35% by weight of said polyols are of the polycaprolactone type.

In another currently preferred embodiment hereof, the composition comprises;
(a) a base component consisting of one or more polyols, said one or more polyols having an average functionality of 2.0-6.3; wherein at least 90% by weight of said one or more polyols have aliphatic polyester segments included therein and have a molecular weight of 300-2,400 g/mol; and
(b) a curing agent component consisting of one or more polyisocyanates, said one or more polyisocyanates having an average functionality of 2.0-2.8; wherein at least 90% by weight of said one or more polyisocyanates are (ii) polyisocyanates of the allophanate type having a molecular weight of 400-650 g/mol and a functionality of at least 2.0 and less than 2.8

In this embodiment, up to 100% by weight of said one or more polyols may be of the polycaprolactone type.

In one variant of the above embodiment, the one or more polyols have an average functionality of 3.7-4.8, wherein at least 90% by weight of said one or more polyols have aliphatic polyester segments included therein and have a molecular weight of 1,300-1,800 g/mol.

In another variant of the above embodiment, the one or more polyols have an average functionality of 2.0-6.0, wherein at least 90% by weight of said one or more polyols have aliphatic polyester segments included therein and have a molecular weight of 300-2,200 g/mol, and 10-100% by weight of said one or more polyols are of the polycaprolactone type.

In still another variant of the above embodiment, the one or more polyols have an average functionality of 2.0-5.6, wherein at least 90% by weight of said one or more polyols have aliphatic polyester segments included therein and have a molecular weight of 300-2,000 g/mol, and 20-100% by weight of said one or more polyols are of the polycaprolactone type.

In still another variant of the above embodiment, the one or more polyols have an average functionality of 2.0-5.3, wherein at least 90% by weight of said one or more polyols have aliphatic polyester segments included therein and have a molecular weight of 300-1,800 g/mol, and 30-100% by weight of said one or more polyols are of the polycaprolactone type.

In still another variant of the above embodiment, the one or more polyols have an average functionality of 2.0-2.2; wherein at least 90% by weight of said one or more polyols have aliphatic polyester segments included therein and have a molecular weight of 300-500 g/mol, and at least 90% by weight of said one or more polyols are of the polycaprolactone type.

In a still further currently preferred embodiment hereof, the composition comprises:
(a) a base component consisting of one or more polyols, said one or more polyols having an average functionality of 2.0-6.3, wherein at least 90% by weight of said one or more polyols have aliphatic polyester segments included therein and have a molecular weight of 300-2,400 g/mol; and
(b) a curing agent component consisting of one or more polyisocyanates, said one or more polyisocyanates having an average functionality of 2.0-2.8; wherein at least 90% by weight of said one or more polyisocyanates are (iii) polyisocyanates of the uretdion type having a molecular weight of 300-600 g/mol and a functionality of at least 2.0 and less than 2.8.

In this embodiment, up to 100% by weight of said one or more polyols may be of the polycaprolactone type.

In one variant of the above embodiment, the one or more polyols have an average functionality of 3.1-6.2, wherein at least 90% by weight of said one or more polyols have aliphatic polyester segments included therein and have a molecular weight of 1,000-2,300 g/mol, and 5-50% by weight of said one or more polyols are of the polycaprolactone type.

In another variant of the above embodiment, the one or more polyols have an average functionality of 3.4-5.8, wherein at least 90% by weight of said one or more polyols have aliphatic polyester segments included therein and have a molecular weight of 1,200-2,100 g/mol, and 15-40% by weight of said one or more polyols are of the polycaprolactone type.

In still another variant of the above embodiment, the one or more polyols have an average functionality of 3.5-5.5, wherein at least 90% by weight of said one or more polyols have aliphatic polyester segments included therein and have a molecular weight of 1,250-1,950 g/mol, and 25-35% by weight of said one or more polyols are of the polycaprolactone type.

In still another variant of the above embodiment, the one or more polyols have an average functionality of 3.5-5.3, wherein at least 90% by weight of said one or more polyols have aliphatic polyester segments included therein and have a molecular weight of 1,250-1,850 g/mol, and 30-35% by weight of said one or more polyols are of the polycaprolactone type.

The coating compositions of the invention are preferably curable at a temperature not exceeding 50° C., in particular a temperature not exceeding 35° C.

In particular, curing of the coating composition of the invention does not require the presence of moieties which thermally decomposes in order to provide isocyanate groups.

EXPERIMENTALS

Rain Erosion Test (RET)

During the lifetime of a wind turbine blade it is subjected to repeated erosion from colliding with raindrops, dust particles, hailstones, insects and the like. The ability to withstand this erosive exposure is essential for a coating, especially on the leading edge of wind turbine blades.

The Rain Erosion Test is widely accepted as being the most suitable test for evaluating anti-erosive properties of coatings on the leading edge of wind turbine blades. The idea is to simulate the erosive effect from collision with raindrops, dust particles, hailstones and the like by spraying water onto the coated surface of fast moving test subjects.

23 cm long test subjects simulating the leading edge of a wind turbine blade (radius of curvature: 8-9 mm) are coated with 200-300 μm (dry film thickness) of the polyurethane-based coating compositions to be tested. The coating compositions are cured at 50° C. (accelerated conditions) for two days to secure complete cure of the polyurethane binder. (It should be noted that the coating composition was capable of becoming cured at much lower temperatures, but the temperature of 50° C. was chosen for the purpose of the test in order to accelerate curing.)

Figure 3:
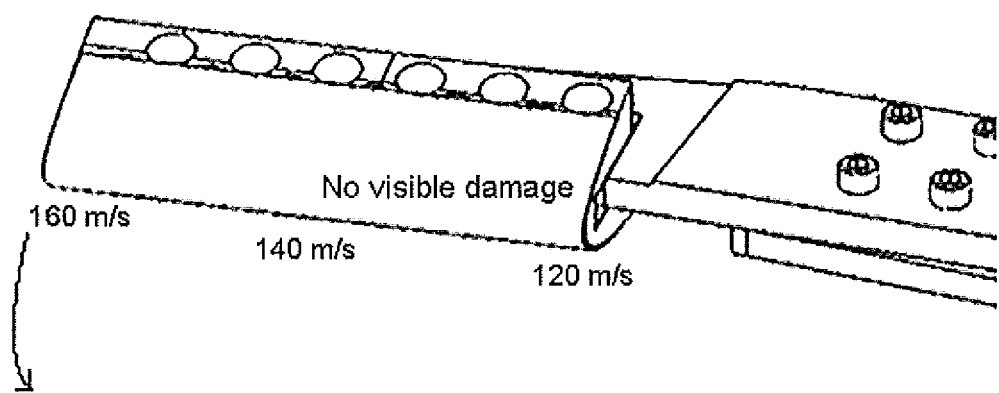
FIG. 3 illustrates the Experimental set-up for the Rain Erosion Test (RET).

Three test subjects are then mounted on a horizontal rotor with three blades. The rotor is spun at a controlled velocity resulting in a test subject velocity ranging from 120 m/s closest to the rotor axis to 160 m/s farthest away from the rotor axis, see FIG. 3.

During the test water drops of controlled diameter (1-2 mm) are sprayed evenly over the rotor and onto the coating surface at a controlled and constant rate (30-35 mm/h).

Every 30 minutes the rotor is stopped and the coating surface on the leading edge of the test subject is visually examined for defects.

The acceptance criterion used is minimal or no visible damages to the coating on the leading edge of the test subject at 140 m/s and slower (see FIG. 3) after 1½ hours exposure. High performance coatings have no visible damages to the coating on the leading edge of the test subject at 140 m/s and slower after 3 hours exposure. (140 m/s equals the "length of damaged area" of 11.5 cm. See Example 2 and FIGS. 1 and 2.)

Example 1—Coatings

| | Reference Coatings | | | | | | |
|---|---|---|---|---|---|---|---|
| | Percent by weight, wet coating composition | | | | | | |
| | Ref. Coating 1 | Ref. Coating 2 | Ref. Coating 3 | Ref. Coating 4 | Ref. Coating 5 | Ref. Coating 6 | Ref. Coating 7 |
| Polyol | 34 | 29 | 28 | 27 | 0 | 24 | 27 |
| Hydroxyl functional polyester resins[a] | 34 | 29 | 28 | 7 | 0 | 16 | 16 |
| Hydroxyl functional polyester resin[e] (Polycaprolactone type) | 0 | 0 | 0 | 20 | 0 | 8 | 11 |

Reference Coatings

| | Ref. Coating 1 | Ref. Coating 2 | Ref. Coating 3 | Ref. Coating 4 | Ref. Coating 5 | Ref. Coating 6 | Ref. Coating 7 |
|---|---|---|---|---|---|---|---|
| Polyisocyanate | 17 | 17 | 19 | 23 | 32 | 18 | 18 |
| Aliphatic polyisocyanates[b] | 17 | 17 | 11 | 23 | 0 | 18 | 18 |
| Aliphatic polyisocyanate Type (i)[c] | 0 | 0 | 8 | 0 | 32 | 0 | 0 |
| Polyamine[f] | 0 | 0 | 0 | 0 | 20 | 0 | 0 |
| Accelerator | 0.02 | 0.08 | 0.08 | 0.50 | 0 | 0.24 | 0.24 |
| Additives | 5 | 7 | 8 | 7 | 8 | 4 | 5 |
| Fillers and pigments[d] | 13 | 18 | 14 | 18 | 20 | 26 | 27 |
| Solvents | 31 | 30 | 30 | 24 | 19 | 28 | 23 |

Percent by weight, wet coating composition

[a]Functionality 4.6-6.5; molecular weight 1800-2400 g/mol.
[b]Functionality 2.7-3.9; molecular weight 400-850 g/mol.
[c]Functionality 2.0-2.8; molecular weight 500-1500 g/mol.
[d]Pigments and fillers selected from the list containing titanium dioxide, yellow iron oxide, black iron oxide, calcined bauxite and barium sulphate.
[e]Functionality 2.0-2.2; molecular weight 300-500 g/mol,
[f]Functionality 1.8-2.2; molecular weight 550-600 g/mol.

The curing agent component in each of the Reference Coatings 1-4, 6 and 7 contains less than 70% by weight of the three specified types of polyisocyanates (types (i)-(iii)). In fact, Reference Coatings 1, 2, 4, 6 and 7 do not include polyisocyanates of types (i)-(iii), whereas Reference Coating 3 only includes 40% by weight of polyisocyanates of type (i). Reference Coating 5 is a polyurea based coating.

The coating compositions were prepared by simply mixing the constituents in a manner known to the person skilled in the art, i.e. by forming a base and a curing agent, and then subsequently mixing the base and the curing agent so as to form a sprayable composition.

Model Coatings (according to the invention)

Percent by weight, wet coating composition

| | Model Coating 1 | Model Coating 2 | Model Coating 3 | Model Coating 4 | Model Coating 5 | Model Coating 6 |
|---|---|---|---|---|---|---|
| Polyol | 25 | 25 | 30 | 29 | 22 | 25 |
| Hydroxyl functional polyester resin[a] | 25 | 25 | 20 | 19 | 0 | 17 |
| Hydroxyl functional polyester resin (Linear type)[e] | 0 | 0 | 10 | 0 | 0 | 0 |
| Hydroxyl functional polyester resin (Polycaprolactone type)[f] | 0 | 0 | 0 | 10 | 22 | 8 |
| Polyisocyanates | 23 | 23 | 23 | 22 | 26 | 18 |
| Aliphatic polyisocyanate[b] | 4 | 4 | 0 | 0 | 0 | 0 |
| Aliphatic polyisocyanate Type (i)[c] | 19 | 20 | 0 | 0 | 0 | 0 |
| Aliphatic polyisocyanate Type (ii)[g] | 0 | 0 | 22 | 22 | 26 | 0 |
| Aliphatic polyisocyanate Type (iii)[h] | 0 | 0 | 0 | 0 | 0 | 18 |
| Accelerator | 0.1 | 0.1 | 0.1 | 0.1 | 0.1 | 0.5 |
| Additives | 6 | 7 | 7 | 7 | 8 | 5 |
| Fillers and pigments[d] | 16 | 15 | 16 | 17 | 15 | 26 |
| Solvents | 29 | 30 | 24 | 24 | 28 | 26 |
| Viscosity (mPa · s) | 750 | n.d. | n.d. | n.d. | n.d. | n.d. |

[a]Functionality 4.6-6.1; molecular weight 1800-2400 g/mol.
[b]Functionality 2.7-3.5; molecular weight 400-650 g/mol.
[c]Functionality 2.0-2.8; molecular weight 500-1500 g/mol.
[d]Pigments and fillers selected from the list containing titanium dioxide, yellow iron oxide, black iron oxide, calcined bauxite and barium sulphate.
[e]Functionality 2.0-2.2; molecular weight 350-600 g/mol.
[f]Functionality 2.0-2.2; molecular weight 300-500 g/mol.
[g]Functionality 2.0-2.8; molecular weight 400-650 g/mol.
[h]Functionality 2.0-2.8; molecular weight 300-600 g/mol.

Example 2—Rain Erosion Test (RET)

| | Rain Erosion Test Results Length of Damaged Area (cm) | | | | | | | | | | | | | |
|---|---|---|---|---|---|---|---|---|---|---|---|---|---|---|
| Hours | 0 | 1 | 1.5 | 2 | 2.5 | 3 | 4 | 5 | 6 | 7 | 8 | 9 | 10 | 11 |
| Ref. 1 | 0 | — | 7 | 9 | 14 | 18 | — | — | — | — | — | — | — | — |
| Ref. 2 | 0 | — | 17 | 20 | 21 | 22 | — | — | — | — | — | — | — | — |
| Ref. 3 | 0 | — | 6 | 9 | 19 | 19 | — | — | — | — | — | — | — | — |
| Ref. 4 | 0 | — | 4 | 6 | 7 | 14 | — | — | — | — | — | — | — | — |
| Ref. 5 | 0 | — | 8 | 10 | 19 | 20 | — | — | — | — | — | — | — | — |
| Ref. 6 | 0 | 20 | — | — | — | — | — | — | — | — | — | — | — | — |
| Ref. 7 | 0 | 20 | — | — | — | — | — | — | — | — | — | — | — | — |
| Model 1 | 0 | — | 2 | 4 | 5.5 | 7 | — | — | — | — | — | — | — | — |
| Model 2 | 0 | — | 0 | 5 | 8 | 8 | — | — | — | — | — | — | — | — |
| Model 3 | 0 | — | 0 | 9.5 | 9.5 | 10 | 12 | 13 | 15 | 18 | 18 | 18 | 20 | 20 |
| Model 4 | 0 | — | 0 | 3 | 3 | 3 | 5 | 5 | 5.5 | 6 | 6 | 6.5 | 7 | 7 |
| Model 5 | 0 | — | 0 | 0 | 0 | 0 | 0 | 9 | 9 | 9 | 9 | 9.5 | 9.5 | 9.5 |
| Model 6 | 0 | — | 0 | 0 | 0 | 3 | — | — | — | — | — | — | — | — |

The term "Length of damaged area" is intended to mean the distance from the fastest moving part of the test subject to the visible damage located closest to the rotor axis. It does not necessarily mean that the coating is completely removed from this area. Model coating 5 is an example of this.

Model coating 5 showed no visible damage for 4 hours. After 5 hours a local weakness resulted in a small damage 9 cm from the fastest moving part of the test subject. After 11 hours it had only developed an additional 0.5 cm. Hence, it is suspected that the damage observed after 5 hours might be the result of a defect (e.g. an air bubble) in the coating at 9 cm from the fastest moving part of the test subject, and not a weakness of the coating material as such. In fact, when disregarding the damage at 9 cm, the Model coating 5 appeared to have the best performance.

Figure 2:
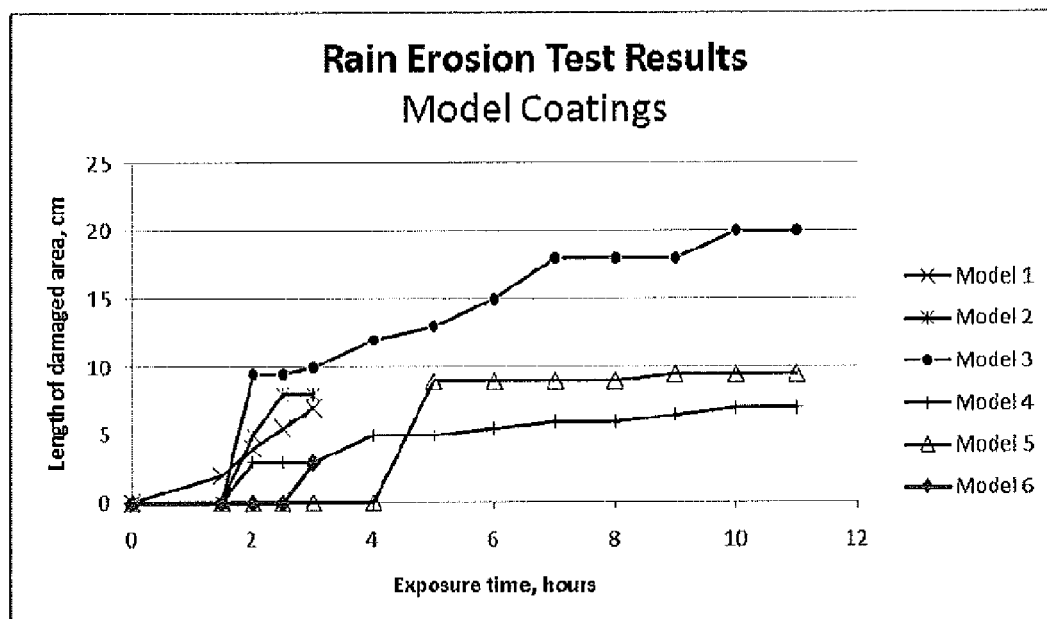
FIG. 2 illustrates the results of the Rain Erosion Test (RET) for a series of six Model Coatings.

The results of the Rain Erosion Test are illustrated in FIG. 1 and FIG. 2.

The invention claimed is:

1. A wind turbine blade having on at least a part of the outer surface thereof, as the outermost layer, a polyurethane-based coating, said coating including a polyurethane binder prepared from:
   (a) a base component consisting of one or more polyols, said one or more polyols having an average functionality of at least 2.0 and less than 8.0; wherein at least 50% by weight of said one or more polyols have aliphatic polyester segments included therein and have a molecular weight of 300-3,000 g/mol; and
   (b) a curing agent component consisting of one or more polyisocyanates, said one or more polyisocyanates having an average functionality of less than 3.0; wherein at least 50% by weight of said one or more polyisocyanates are selected from:
      (i) polyisocyanates having aliphatic polyester segments included therein, and having a molecular weight of 500-3,000 g/mol and a functionality of at least 2.0 and less than 3.0; and
      (ii) polyisocyanates of the uretdion type having a molecular weight of 250-2,000 g/mol and a functionality of at least 2.0 and less than 3.0,
   wherein the polyurethane-based coating has a viscosity of 150-15,000 mPa·s at application to the wind turbine blade as measured at 25° C. in accordance with ISO 2555:1989.

2. The wind turbine blade according to claim 1, wherein the polyurethane binder is prepared in the presence of one or more accelerators.

3. The wind turbine blade according to claim 1, wherein the thickness of the cured coating is 20-1,000 μm.

4. The wind turbine blade according to claim 1, wherein the ratio of the number of isocyanate groups in the curing agent component to the number of hydroxyl groups in the base component is in the range of 80:100 to 160:100.

5. The wind turbine blade according to claim 1, wherein the curing agent comprises polyisocyanate types based on hexamethylene diisocyanate.

6. The wind turbine blade according to claim 1, wherein the coated part of the outer surface includes at least a predominant portion of the leading edge of the blade.

7. The wind turbine blade according to claim 1, wherein at least 70% by weight of said one or more polyols have aliphatic polyester segments included therein and have a molecular weight of 300-3,000 g/mol.

8. The wind turbine blade according to claim 3, wherein the thickness of the cured coating is 50-300 μm.

* * * * *